United States Patent Office 2,775,631
Patented Dec. 25, 1956

2,775,631

PRODUCTION OF AROMATICS FROM OLEFINS AND CARBON DIOXIDE

Norman C. Carter, Old Ocean, Tex., and John S. Cromeans, Louisville, Ky., assignors to Phillips Petroleum Company, a corporation of Delaware No Drawing. Application January 14, 1953, Serial No. 331,328

9 Claims. (Cl. 260—673)

This invention relates to the production of aromatic hydrocarbons. In one aspect the invention is concerned with the conversion of olefins into aromatics. In another aspect the invention is concerned with the use of carbon dioxide to convert olefins into aromatics. In a further aspect the invention is concerned with the production of high yields of aromatics from certain olefins and carbon dioxide, preferably in the absence of hydrogen, in the presence of a catalyst, as set forth and described below.

Catalyst compositions comprising minor proportions of catalytically active materials, such as oxides of molybdenum, in combination with a major proportion of an alumina carrier material have been used to promote many hydrocarbon conversion reactions. Such catalysts have been employed extensively in the treatment of liquid hydrocarbons and processes involving dehydrogenation, cyclization and other reactions incidental to the reforming of naphtha. Generally, the feed material comprises either hydrocarbons containing six or more carbon atoms in a straight chain or naphthenes containing six or more carbon atoms. Also, the reaction is generally carried out in the presence of hydrogen which influences the reaction in the proper direction to form aromatics and reduces the formation of carbon deposits on the catalyst. Small yields of aromatic hydrocarbons have also been synthesized from carbon monoxide and hydrogen in the presence of suitable catalysts, such as iron, nickel, or cobalt, and suitable reaction conditions.

We have now discovered that aliphatic olefin hydrocarbons containing at least five carbon atoms, preferably five to eight carbon atoms, in a straight chain and carbon dioxide may be catalytically reacted over a molybdenum oxide-promoted catalyst to form aromatic hydrocarbons. The molybdenum oxide may be supported on one of the well known carrier materials, such as alumina or silica-alumina, and may be prepared by one of the usual methods, such as by co-precipitation, impregnation, or the like.

A catalyst of the invention is one containing 20 weight percent molybdenum oxide, 5 weight percent silica, and 75 weight percent alumina. Preferably the catalyst of our invention will contain 5 to 35 weight percent of molybdenum oxide, 0 to 10 weight percent of silica, and 55 to 95 weight percent of alumina. The temperature normally employed in the process of our invention is within the range of about 750–1100° F. and preferably is between about 800–950° F. Although atmospheric pressure can be used, the pressure is normally greater than atmospheric and less than 1000 p. s. i., and preferably within a range of about 40–350 p. s. i. A liquid hourly space velocity of 0.5–10 may be used and a value in the range of about 0.7 to 3.0 is preferred. The mol ratio of carbon dioxide to hydrocarbon is generally maintained in the range of 0.5:1 to 10:1 and preferably in the range of 0.7:1 to 4:1. The reactions in our process can be carried out in the presence of hydrogen; however, the yield of aromatic hydrocarbons is usually much lower in the hydrogen-containing feed streams and for this reason hydrogen is preferably excluded in the now preferred embodiment of the invention.

Therefore, according to this invention there has been provided a process for the production of aromatic hydrocarbons which comprises contacting an aliphatic olefin hydrocarbon containing at least five carbon atoms, and preferably 5 to 8 carbon atoms, in a straight chain, with a molybdenum oxide-promoted catalyst at a temperature in the range 750–1100° F. under conditions of pressure, catalyst composition, space velocity and ratio of carbon dioxide to olefin suitable to obtain optimum yields under any particular selection and conditions of feed stocks, etc., within the limits set out herein.

The aliphatic olefin hydrocarbons used in the process of our invention can be derived from any suitable source, for example, by dehydrogenation of aliphatic paraffin hydrocarbons. As noted, the olefins employed contain from five to eight carbon atoms in a straight chain. Higher straight-chain hydrocarbons which can be cracked to lower olefins can also be used. Other olefins which can be isomerized to olefins containing five to eight carbon atoms in a straight chain can also be employed. The conversion of aliphatic paraffin hydrocarbons into aromatic hydrocarbons is generally not very effective with our particular catalyst so that the paraffin hydrocarbons are preferably first dehydrogenated to olefin hydrocarbons and then reacted over the molybdenum oxide catalyst.

The catalyst employed in our hydrocarbon conversion process can be formed either by co-precipitation of suitable reagents, impregnation of a suitable carrier with a solution of the reagent, or some other method known in the art. In a co-precipitation method, silica in the form of silicic acid, molybdenum as a solution of ammonium paramolybdate, and aluminum as a solution of aluminum nitrate are admixed and a gel formed by the addition of ammonium hydroxide until a pH of 7.5 is reached. The mixture is dried for 24 hours at 220° F. and the aluminum nitrate present is decomposed to the oxide by heating to a temperature of about 750° F. The catalyst mixture is pilled and then calcined at 1000° F. Other suitable methods of preparing a catalyst according to the invention can be employed.

After prolonged conversion of olefins to aromatics, carbon formation on the surfaces of the catalyst reduces the effectiveness of the catalyst. Regeneration can be effected by heating the deactivated catalyst in an oxygen-containing atmosphere at a temperature in the range of about 900–1000° F. for a period of time sufficient to remove the carbonaceous material.

A wide variety of products is obtained in the practice of our invention. Simple aromatics such as benzene, toluene, xylene, and some higher alkyl benzenes are readily obtained under the conditions described herein and can be recovered in a pure state. A high-octane motor fuel can be recovered as a product of our invention by subjecting a low-octane hydrocarbon fraction containing suitable olefin hydrocarbons to our hydrocarbon conversion process and separating the reactor effluent into the products desired by means well known in the art.

Results of the conversion of pentene-1, pentene-2, and hexene-1 to aromatic hydrocarbons, under various conditions and according to the invention, are given in the following table:

aration zone to which the process effluents are removed from the said process.

| Run No. | 1 | 2 | 3 | 4 | 5 | 6 | 7 |
|---|---|---|---|---|---|---|---|
| Hydrocarbon feed | Pentene-1 | Pentene-1 | Pentene-1 | Pentene-1 | Pentene-1 | Pentene-2 | Hexene-1. |
| Feed Gas | $CO_2$ | $CO_2$ | $CO_2$ | $CO_2+H_2$[a] | $H_2$ | $CO_2+H_2$[a] | $CO_2+H_2$.[a] |
| Temperature, °F | 860 | 900 | 900 | 900 | 900 | 900 | 900. |
| P. s. i. g | 150 | 150 | 150 | 150 | 150 | 150 | 150. |
| LV./V./Hr | 1.17 | 1.99 | 1.17 | 1.02 | 1.01 | 0.99 | 1.01. |
| $CO_2$/HC-Mol | 2.87 | 1.78 | 0.85 | 0.79 | 0 | 0.95 | 0.94. |
| Hydrocarbon Effluent, Wt. percent: | | | | | | | |
| $C_1$ | 0.2 | 0.4 | 1.3 | 2.3 | 4.4 | 2.4 | 2.3. |
| $C_2$ | 0.6 | 1.2 | 1.6 | 2.7 | 5.4 | 2.5 | 3.6. |
| $C_3$ | 1.1 | 1.7 | 1.7 | 4.9 | 7.3 | 4.6 | 8.1. |
| $C_4$ | 2.0 | 3.5 | 5.2 | 9.0 | 10.2 | 9.1 | 9.3. |
| $C_5$ | 26.0 | 26.0 | 16.4 | 45.3 | 67.8 | 46.1 | 38.2.[b] |
| $C_5$= | 52.6 | 47.3 | 61.2 | 23.7 | Trace | 21.1 | 25.1.[c] |
| Arom | 17.5 | 19.9 | 12.6 | 12.1 | 4.9 | 14.2 | 13.4. |
| Total Conversion, Wt. percent | 47.4 | 52.7 | 38.8 | 76.3 | 100 | 78.9 | 74.9. |
| Aromatic Ultimate Yield, percent | 36.9 | 37.8 | 32.5 | 15.9 | 4.9 | 18 | 17.9. |
| Carbon, Wt. percent Feed | 9.3 | 6.9 | 14.8 | 8.8 | 2.9 | 7.5 | 8.5. |

[a] $CO_2+H_2$ Feed Gas—50.2% $CO_2$; 49.8% $H_2$.
[b] $C_5+$.
[c] Hexenes.

Among the points which can be noted from the foregoing tabulated data, the following are called to attention. The data show generally that a substantial yield of aromatics from pentene-1 is obtained when carbon dioxide is present, is not obtained in the absence of carbon dioxide, and that the presence of hydrogen in the hydrocarbon and carbon dioxide-containing stream is actually detrimental to the conversion of pentene-1 to aromatics.

Thus, viewing runs 3, 4 and 5, it is noteworthy that "Aromatic ultimate yield—percent" was 32.5 in run 3 whereas in run 4, in which substantially the same carbon dioxide to hydrocarbon ratio was maintained but in which a substantial proportion of hydrogen was added, the yield was only 15.9. Still further, in run 5, in which no carbon dioxide was employed but in which hydrogen was employed, only 4.9% yield was obtained. Other points can be noted from a consideration of the data. For example, the relative proportions of $C_5$ saturate and $C_5$ unsaturate are quite different if one goes from, say, run 3 to run 4, and run 4 to run 5. Thus, in run 5 there would be substantially no pentene-1 remaining for recycle purposes. In run 4 only 23.7% of the hydrocarbon effluent is made up of unsaturate $C_5$. In run 3, 61.2% of unsaturate $C_5$ remains for recycle purposes. Thus with carbon dioxide alone, in run 3, of the three runs here discussed, 32.5% yield and the highest available $C_5$ unsaturate for recycle were obtained. Still further points of interest to one skilled in the art will be noted by him upon perusal of the data.

Reasonable variation and modification are possible within the scope of the foregoing disclosure and the appended claims to the invention, the essence of which is that very good yields of aromatic hydrocarbons or a high octane motor fuel can be recovered by subjecting an olefin, as described, preferably containing five and not more than eight carbon atoms in a straight chain and carbon dioxide, to a molybdenum oxide catalyst, for example a molybdenum oxide-silica-alumina catalyst, at a temperature in the range 750–1100° F. and other conditions as set forth, or subjecting a low octane value fuel containing such an olefin to the process set forth and described herein, and recovering the products from a sep-

We claim:

1. The conversion of a straight chain olefin selected from the group consisting of a pentene and a hexene into an aromatic hydrocarbon which comprises contacting said olefin and carbon dioxide in a ratio of carbon dioxide to hydrocarbon of at least 0.5 as the sole effective reactants with a molybdenum oxide catalyst at a temperature in the range 750–1100° F. for a time sufficient to convert an appreciable proportion of the olefin into an aromatic hydrocarbon.

2. A conversion according to claim 1 wherein the carbon dioxide to hydrocarbon is present in a mol ratio of 0.5:1 to 10:1, the pressure is in the range atmospheric to 1000 p. s. i., and the space velocity is in the range 0.5–10.

3. A conversion according to claim 1 wherein said straight-chain olefin is pentene-1.

4. A conversion according to claim 1 wherein said straight-chain olefin is pentene-2.

5. A conversion according to claim 1 wherein said olefin is hexene-1.

6. A conversion according to claim 1 wherein the conversion is effected in the substantial absence of hydrogen.

7. A conversion according to claim 1 wherein the straight-chain olefin and carbon dioxide are substantially the only reactants present and said catalyst is the sole catalyst present.

8. A conversion according to claim 1 wherein said molybdenum oxide catalyst is a molybdenum oxide-promoted silica-alumina catalyst.

9. A conversion according to claim 8 wherein said catalyst contains by weight percent 5–35 of molybdenum oxide, 0–10 of silica, and 55–95 of alumina.

References Cited in the file of this patent

UNITED STATES PATENTS

| 2,124,566 | Grosse | July 26, 1938 |
| 2,257,082 | Yarnall | Sept. 23, 1941 |
| 2,284,468 | Burk et al. | May 26, 1942 |
| 2,284,603 | Belchetz et al. | May 26, 1942 |
| 2,345,128 | Korpi | Mar. 28, 1944 |
| 2,363,768 | Zetterholm | Nov. 28, 1944 |
| 2,645,605 | Lang | July 24, 1953 |